Dec. 12, 1967   W. P. ROWLAND   3,357,773
PATTERNED SHEET MATERIAL
Filed Dec. 31, 1964   3 Sheets-Sheet 1

INVENTOR.
WILLIAM P. ROWLAND
BY
Peter L. Costas
ATTORNEY

Dec. 12, 1967  W. P. ROWLAND  3,357,773
PATTERNED SHEET MATERIAL
Filed Dec. 31, 1964  3 Sheets-Sheet 2

INVENTOR.
WILLIAM P. ROWLAND
BY
ATTORNEY

Dec. 12, 1967  W. P. ROWLAND  3,357,773
PATTERNED SHEET MATERIAL

Filed Dec. 31, 1964  3 Sheets-Sheet 3

INVENTOR.
WILLIAM P. ROWLAND
BY
*Peter L. Costas*
ATTORNEY

United States Patent Office 3,357,773
Patented Dec. 12, 1967

3,357,773
PATTERNED SHEET MATERIAL
William P. Rowland, Southington, Conn., assignor to Rowland Products, Incorporated, Kensington, Conn., a corporation of Connecticut
Filed Dec. 31, 1964, Ser. No. 422,842
19 Claims. (Cl. 350—167)

The present invention relates to sheet materials providing visual patterns and, more particularly, to sheet materials having a moire appearance.

This application is a continuation-in-part of applicant's copending United States patent application Ser. No. 261,385, filed Feb. 27, 1963, and entitled, Sheet Materials for Optical Effects and Methods of Making Same, wherein there is described a novel sheet material having closely spaced and relatively minute curvilinear lens-like formations on one surface and reflective formations in a plane spaced therefrom which phase in and out of axial registry with the lens-like formations along the horizontal axes of the sheet material to produce varying optical effects by variations in the angle of incidence of the light rays focused by the lens-like formations onto the tapering side walls of the reflective formations. Generally, such sheet material provides a wide range of visual patterns including the appearance of three-dimensional depressions or projections of circular and oval configuration and of varying size. The phasing in and out of axial registry may be effected by providing a difference in the spacing between the centers of the lens-like formations and of the reflective formations or by misaligning the axes of the pattern of the lens-like formations and of the pattern of the reflective formations. In the copending United States application of Hugh Rowland, Ser. No. 286,259, filed June 7, 1963, and entitled, Multicolored Sheet Material for Optical Effects and Methods of Making Same, now abandoned, there is described an improvement of such sheet material for providing multicolored optical effects.

It is an object of the present invention to provide a novel sheet material having an attractive moire appearance.

It is also an object to provide such moire sheet material which is relatively economical and adapted to utilization for various decorative purposes.

Another object is to produce such synthetic plastic sheet material presenting a visual pattern in the form of ribbons of various configuration.

Other objects and advantages will be readily apparent from the following detailed specification and claims and the appended drawings wherein:

Figure 10:
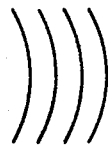
FIGURE 10 is a similar illustration showing the axis lines of FIGURE 9 bowed into curvilinear configuration by a stretching operation.
Figure 19:
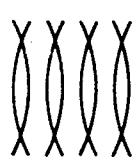

FIGURE 19 diagrammatically illustrates the effect of superposing in opposite directions two patterns which have been elongated as in FIGURE 10.

Figure 14:
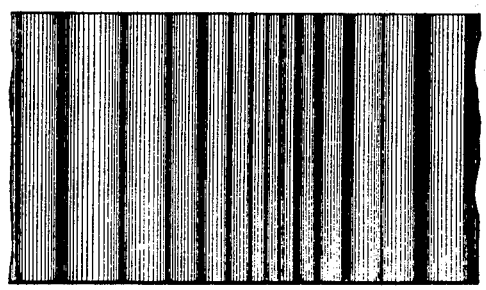
Figure 20:
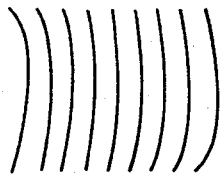
Figure 21:
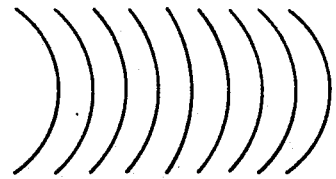
Figure 22:
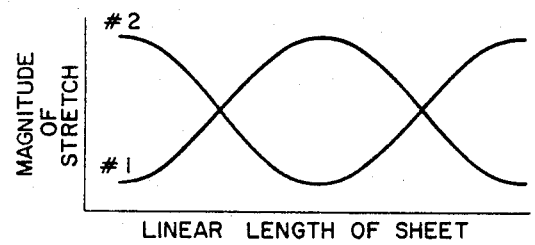

FIGURE 20 diagrammatically illustrates by lines the distortion of a linear axis resulting from eccentric elongation of first one side and then the other side of the sheet material;

FIGURE 21 diagrammatically illustrates by lines the periodic distortion of a linear axis resulting from cyclic increase in elongation of the sheet material; and FIGURE 22 graphically illustrates two cyclically elongated patterns as superposed to form a visual pattern similar to that of FIGURE 14.

It has now been found that the foregoing and related objects may be readily attained in sheet material having a body portion of substantial length and width dimensions providing front and rear surfaces and being of substantially uniform thickness. Extending in axes perpendicular to the front surface thereof is a multiplicity of closely spaced, substantially identical curvilinear lens-like formations arranged in a first pattern on the front surface thereof and a multiplicity of closely spaced, substantially identical reflective formations arranged in a second pattern on the rear surface extend in axes perpendicular to the front and rear surfaces and wherein the formations diminish in horizontal cross-section along the vertical and horizontal axes of the sheet material, i.e., they diminish in cross section outwardly from the body portion to provide side walls tapering inwardly from the body portion toward the vertical axes. The lens-like formations are curvilinear along both horizontal and vertical axes of the sheet material, and the reflective formations phase in and out of axial registry with the lens-like formations along at least one horizontal axis of the sheet material to provide varying optical effects due to variation in the angle of incidence of light rays focused by the lens-like formations of the front surface onto the tapering side walls of the reflective formations. Each of the patterns has a plurality of axes along which the formations are arranged and the lens-like and reflective formations are in substantially the same degree of axial alignment over a multiplicity of formations along one axis of one pattern in some areas of the sheet material and the period for the formations to phase into and out of axial registry is greater along this axis in at least some areas of the sheet material than the period for such phasing along another axis of the sheet material. In this manner, the variations in period and extended areas of alignment produce bands of brightly reflective areas and poorly reflective areas which form a visual moire pattern.

This extended alignment of the formations and variation of the period is provided by effecting variations in alignment of the pattern of formations of the front surface with respect to that of the parallel plane by various means. The type and degree of variation determines the resultant visual pattern as will be fully explained hereinafter. Accordingly, the desired and visual pattern may be selected and predetermined prior to fabrication of the sheet material.

Generally, the desired variation relies upon three types of distortion in one or both patterns, either alone or in combination. In one type, one of the axes of a pattern is curvilinear and disposed so that it crosses an axis of the other pattern, the latter axis being rectilinear, or of equal curvature and extending oppositely, or of dissimilar curvature. In this manner, the axes will cross at angles of generally less than 20 degrees and in most areas at an angle of less than 5 degrees, and the axes will extend nearly parallel in some areas of the sheet material so as to provide the desired variations in period and extended alignment. Generally, this will be small so that it may amount only to about 1–10 lenses over an arc chord of 2400 lenses.

In the second type, the pattern employs a plurality of axes, preferably three, which intersect to define two (or three) different included angles. This asymmetric pattern is then superposed with another asymmetric pattern, or a symmetrical pattern, or a curvilinear pattern so that axes of each extend parallel and at least one other axis of each diverge. The formations will be in extended alignment in a substantially infinite period along the parallel axes.

In the third type, the pattern is one in which the spacing between centers of the formations of the pattern becomes greater and smaller cyclically within a small percentage range of the average spacing, i.e., not more than about 10 percent and preferably less than about 4 percent, along at least one axis. When such a pattern is superposed upon a similar pattern out-of-phase or upon a uniformly spaced pattern wherein the spacing approaches the average of the varying pattern, the formations will move into and out of phase over varying periods along the sheet material. In this manner, bands of light and dark may be created which vary in width depending upon the period at a given area, and areas wherein the formations are in substantailly the same degree of axial alignment over a multiplicity of formations will occur when the increment of spacing between centers is small and the spacing therebetween closely approximates that of the cooperating portion of the other pattern.

The several types of distortion of pattern are to some degree combined in a simple but highly effective manner. A pattern having symmetrical axes (defining equal included angles at their intersection) is used to form sheet material having regularly spaced formations. The sheet material is then stretched under conditions which allow the sides of the material to neck in. Presumably, the web between embossments is distorted in the direction of stretching. The resultant structure is one in which the pattern is most elongated in its center area if the stretching action has not been eccentric and produces some variation in spacing transversely of the direction of stretch between the centers of the formations in the direction of stretch. In addition, the pattern is distorted so that the axes no longer intersect to define equal angles and so that one axis becomes substantially curvilinear as the result of the distortion produced by the stretching. The cyclic and eccentric effects hereinbefore discussed also may be superimposed upon the stretching operation to obtain the variation which they can produce.

The phrase "distorted pattern" as used herein refers to a pattern which is not uniform or symmetrical throughout and along all axes, i.e., having varying spacing between centers of formations along at least one axis, or axes which intersect to define two (or more) differing included angles, or which have a non-rectilinear or curvilinear axis, all as hereinbefore described.

This preferred sheet material is described in complete detail in applicant's aforementioned copending United States application Ser. No. 261,385. As pointed out therein, generally the lens-like formations are most desirably embossments of a configuration which will focus substantially the light rays entering thereinto from various directions, and, accordingly, have a curvilinear convex periphery and horizontal cross-section, i.e., they are curvilinear in planes which include the perpendicular axes of the embossments and in planes which extend through such perpendicular axes. Although parabolic configurations are the more highly efficient focusing elements, major segments of spheres, preferably approximating hemispheres, have also proven highly effective. Since some distortion of the spherical configuration may occur and be tolerated in the present invention, the term "spheroidal" is used herein to encompass both spherical configurations and those configurations deviating somewhat therefrom. Although the embossments on the rear or other surface may be prismatic or conical in configuration, it is far more preferable to employ convex lens-like embossments to obtain considerably greater optical activity and greater reflection as well as retroreflection. When lens-like embossments are employed on the rear surface and a reflective coating is applied thereto, the convex side walls of the rear embossments may taper more gradually to obtain greatest reflection from the center of the lens-like embossments in forming the mirrors. However, either the critical angle for reflection in the plastic material, or a reflective coating where such critical angle is not employed, or the combination thereof, may be utilized to provide reflection of the predominant portion of the light rays impinging upon the tapering side walls of the reflective embossments.

For most applications to avoid unduly large nodes, the embossments must be of relatively small width and closely spaced so as to obtain the repetitive phasing in and out of axial registry within relatively short distances. Generally, the embossments must be less than about 0.040 inch in width to achieve the desired effect and preferably less than about 0.025 inch, and the spacing and size of the embossments of both patterns should be substantially the same, except as distorted to produce the visual pattern.

Although a two axis pattern may be employed for laying out the embossments, the preferred pattern employs a hexagonal array to maintain close spacing and to minimize flats between embossments as well as to enhance the optical effects.

To phase the embossments of the rear surface in and out of axial registry with the lens-like embossments of the front surface along a given horizontal axis of the sheet material, the vertical misalignment of the two embossments progressively varies along that horizontal axis of the pattern of formations. This may be effected by variation in the relative spacing between centers of adjacent embossments in the two surfaces, by the combination of shape and spacing of the embossments on the two surfaces, by arranging patterns of similar embossments with an axis of one pattern diverging from an axis of the superposed pattern, or by superposing patterns having asymmetric axes or non-rectilinear axes so that one set of axes is not aligned. However, the degree of non-alignment of the patterns of embossments and the consequent phasing in and out of axial registry of the embossments on the front surface with respect to the embossments on the rear surface is preferably controlled to maintain relatively large linear length to a single node or complete phase and also to ensure optimum reflection or retroreflection over a wide angle of light incidence in at least some areas of the sheet material.

The thickness of the sheet material is largely dependent upon the focal length of the lens-like embossments of the front surface (and of the rear surface when lens-like embossments are employed thereon). For purely decorative effect, the total thickness of the sheet material may vary from about one-half to two and one-half times the focal length of the lens-like embossments on the front surface. For achieving a high degree of retroreflectivity with lens-like reflective embossments, a highly reflective coloring agent (or agents) desirably is applied to the major portion of the rear surface, and the thickness of the sheet should be substantially equal to the focal length of the lens-like embossments on the front surface causing the light rays to focus at about the centers of the reflective embossments or to the sum of the focal lengths of the lens-like embossments on the front surface and the lens-like "mirrors" on the rear surface, the former being optimum for maximum retroreflectivity. However, a measure of variation and deviation is tolerable in the present invention since constant axial phasing over the axes of the sheet will result in refracted light rays striking and focusing at various points along the convexly curved surfaces of the rear lens-like projections of each period or phase so as to achieve a significant amount of retroreflection from one or more combinations of embossments in various degrees of axial registration in a single phase or period of the pattern.

Various synthetic plastics may be used for the sheet material of the present invention, including acrylic acid esters such as methyl methacrylate, cellulose acetate, cellulose acetate-butyrate, cellulose proprionate, vinyl chloride and copolymers thereof, polystyrene, polycarbonates, cellulose nitrate, polypropylene and polyethylene. Laminates may be desirable to provide more highly weather and abrasion-resistant surfaces such as by use of very thin surface films of polyethylene terephthalate.

Although it might be possible to emboss the two surfaces of a single sheet by a pair of embossing rollers, there is considerable difficulty in obtaining good flow and formation of the synthetic plastic of the relatively thin sheeting in the engraved recesses of the rollers so that well-formed embossments which are substantially identical across each surface are obtained. Moreover, some difficulty may also be experienced due to surface slippage and flow in maintaining the desired degree of non-registry of the embossing patterns to obtain the desired phasing along the several axes of the sheet material. It has been found that optimum formation of the embossments, and practical control of the non-registry may be obtained by laminating back-to-back two strips of sheet material each embossed on one surface under conditions which produce the desired patterns of embossments, the lamination being conveniently effected by use of solvent for the sheet material or a thin layer of adhesive and relatively light pressure applied by rubber pinch rolls. The desired phasing and variations in period and alignment of the embossments can be assured by use of two different embossing rolls having different patterns of embossments as hereinafter described. Alternatively, the same embossing roll may be used for both strips and the strips may be stretched or shrunk non-uniformly which will generally elongate or shrink the web in the spacing between embossments due to the inner section which will distort the pattern of embossments in the desired manner. Techniques of differential cooling, localized stress relieving following uniform stretching and localized heating may also be employed to produce desired distortion within the pattern. By producing a differential in pattern distortions between the front and back patterns of embossments as by controlled shrinkage or stretch, a wire variety of moire patterns may readily be obtained in accordance with the teachings of the present invention.

Providing a reflective coating on the reflective formations instead of relying entirely upon the critical angle for reflection renders the sheet material more highly reflective and even more optically interesting due to accentuation of highlights and due to accentuation of reflection of incident light rays. The phasing in and out of axial alignment of the lens and reflector formations within each node or phase of the pattern along at least one axis of the patterns produces a multiplicity of areas of dazzling brightness due to reflection of the light in bundles of parallel rays and also effectively ensures a number of lens and reflector combinations to retroreflect light rays over a wide angle of incidence.

When a vacuum metallized or chemically deposited metallic coating is applied to the rear surface, it is highly desirable that it be protected by an outer coating of lacquer, plastic film or other suitable material. For some applications, it may be desirable to overlay the rear surface of the reflectively coated sheet material with a layer of synthetic plastic or other material to provide a flat-surfaced layer which does not interfere with the reflective action of the reflective embossments.

As described in the aforementioned copending application of Hugh Rowland, a sheet material having reflective embossments on the rear surface thereof may provide multicolored, varying optical effects by providing a first coloring agent on a first, substantially identical portion of the embossments and a differential coloring agent on a second, substantially identical portion of the embossments. In this manner, multicolored, varying optical effects are generated by variation in the angle of incidence of light rays focused by said lens-like embossments onto varying points on said first and second colored portions of said reflective embossments.

The term "coloring agent" as used herein refers to lacquers, paints, dyes, metallic films and other materials for providing a color or intensity of color optically distinct from the color of the body of the sheet material, and the term "differential coloring agent" as used herein refers to such lacquers, paints, dyes, metallic films or other materials for providing a color or intensity of color optically distinct from other coloring agents employed and the color of the body of the sheet material.

It will be appreciated that a third or more differentially colored portions may be provided similarly. Generally, the coloring agents should cover the entire rear surface of the sheet material for optimum effect, although for some applications it may be desirable to use portions of the embossments which are free from coloring agent. Generally, the remainder of the sheet material should be substantially transparent or colorless to achieve optimum effectiveness.

The first and differential coloring agents may be applied in various ways to the sheet material such as by printing with suitably patterned plates or rolls, by coating with vaporizable solvent solutions, by vacuum metallizing, by spraying conveniently with suitable masking when both colors are applied thereby, by a roll-type applicator, brush, by wiping, or any other suitable means to provide the coloring agent in a substantially identical location on the embossments. By use of a roller with a compressible absorbent surface for carrying the coloring agent and proper control of pressure, a doughnut-shaped or substantially toroidal band of color can be provided inwardly from the tops of the embossments.

A highly facile and economical method of producing the differential coloring of the sheet material is by first applying a first coloring agent to the tops of the reflective embossments by a roller to provide a substantially concentric crown area thereabout and then applying a differential coloring agent over the entire rear surface of the sheet with the first coloring agent being substantially unaffected thereby and masking its portion of the embossment from the differential coloring agent. This technique is particularly advantageous when a vacuum metallized film is the differential coloring agent. Another technique which has proven advantageous is that of coating the entire surface of the sheet material with a first coloring agent and then lightly abrading the tops of the embossments to remove the first coloring agent therefrom without substantially altering the configuration of the embossments, although some flattening of the tops can be tolerated. The differential coloring agent is then applied to the surface to provide a substantially concentric crown area of the differential coloring agent about the tops of the embossments.

Figure 5:
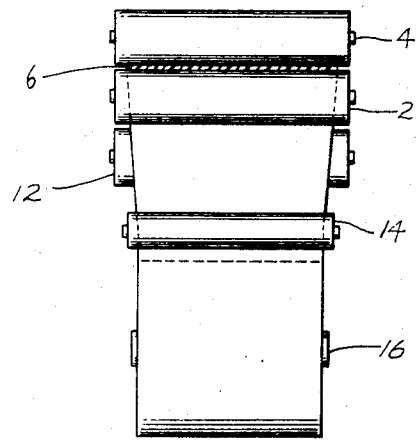
FIGURE 5 is a cross-sectional view of the apparatus of FIGURE 4 along the line 5—5.
Figure 4:
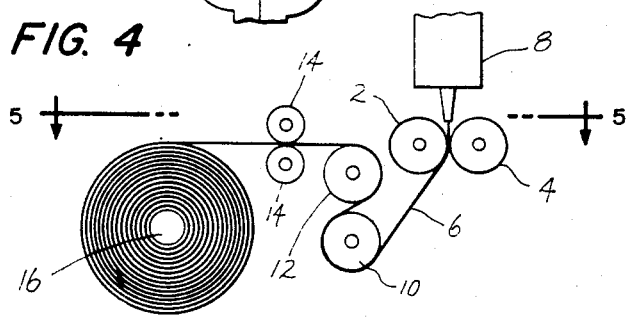
FIGURE 4 is a diagrammatic representation of apparatus employed in making the plastic sheet material of FIGURE 1.

Referring now in detail to the attached drawings, the preferred hexagonal pattern of embossments A of generally hemispherical configuration is illustrated in FIG- URE 6 and the axes intersect to define equal included angles of 60° each. In accordance with one aspect of the present invention, there is shown in FIGURES 4 and 5 an embossing roll 2 employing the preferred hexagonal pattern of embossments shown in FIGURE 6 which co-operates with a rubber-faced back-up roll 4 to define a nip through which the sheet material 6 issuing from the extruder 8 must pass. The sheet material 6 passes about the periphery of the embossing roll 2 and over the steel idler roll 10 and is then drawn over the rubber-surfaced stretching roll 12 which is rotating at a tangential speed greater than that of the rolls 2, 10. Since the steel idler roll 10 does not apply constraining pressure to the surface of the sheet material 6 as it is drawn thereover and the rubber roll 12 does not constrain the sheet material also, the sheet material 6 necks in from the sides as it is stretched between the embossing roll 2 and rubber roll 12 due to the fact that the web of the sheet material between the embossments A is distorted. Finally, the sheet material 6 passes between the take-off rolls 14 and is coiled upon the roll 16.

Figure 3:
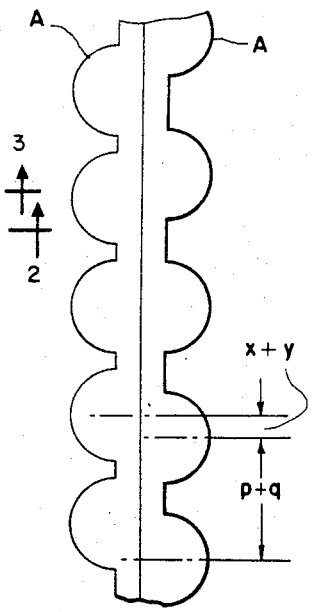
FIGURE 3 is a similarly enlarged cross-sectional view along the line 3—3 of FIGURE 1.

Since the sheet material 6 necks in as it stretches, it is more greatly elongated at the center and least elongated at its sides. This is diagrammatically illustrated in FIGURES 2 and 3 which show, to an exaggerated degree, the increase in the spacing between centers of the embossments towards the center of the sheet material, the arrow in FIGURE 1 indicating the direction of extrusion of the upper pattern.

Figure 9:
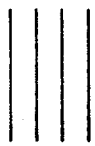
FIGURE 9 is an illustration diagrammatically showing as lines one axis of the pattern of embossments prior to stretching.
Figure 8:
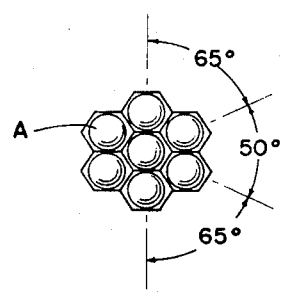
FIGURE 8 is an illustration of another kind and degree of asymmetry of a hexagonal pattern of such embossments as might result from the elongation in the apparatus of FIGURES 4 and 5.

The distortion that takes place in the sheet material is further diagrammatically illustrated in FIGURES 9 and 10. The straight lines in FIGURE 9 representing an axis perpendicular to the direction of stretch are distorted into the curvilinear lines in FIGURE 10 indicating the distortion of axis produced by the stretching and necking in. The elongation and distortion of pattern produced by the stretching are also illustrated in FIGURE 8 wherein the originally equiaxial orientation is here distorted uniformly by drawing more closely both axes extending in the direction of stretch. This condition of distortion will vary transversely of the direction of stretching.

When the stretching roll 12 provides a cyclic increase and decrease in the degree of stretch conveniently by use of phased eccentric cams on both ends of the drive shaft assembly, the amount of distortion will vary cyclically as indicated diagrammatically by the lines in FIGURE 21. The roll 12 may be arranged to stretch the sheet material 6 eccentrically and cyclically first to one side of the center line of the sheet material and then to the other side, conveniently by cams on both ends of the drive shaft assembly which are out of phase by 180°. The resultant distortion of the pattern is diagrammatically illustrated in FIGURE 20 by the cyclically varying curvilinear lines representing an axis.

Figure 1:
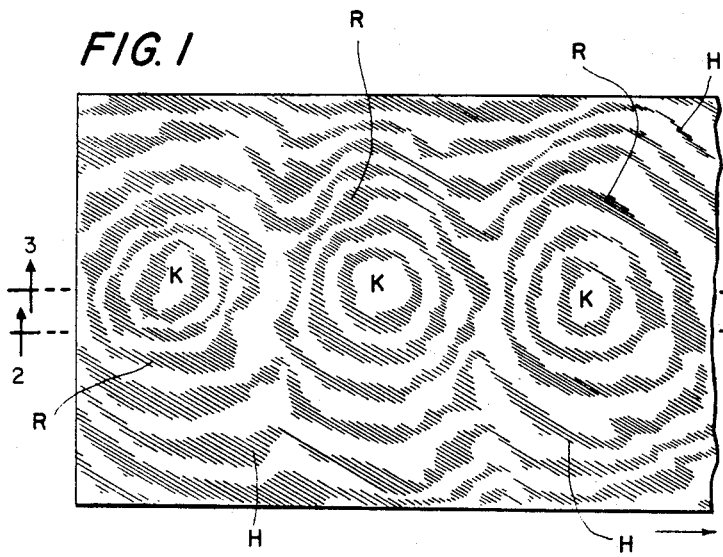
FIGURE 1 is a fragmentary plan view to the naked eye of sheet material with a moire appearance produced in accordance with one embodiment of the present invention.
Figure 2:
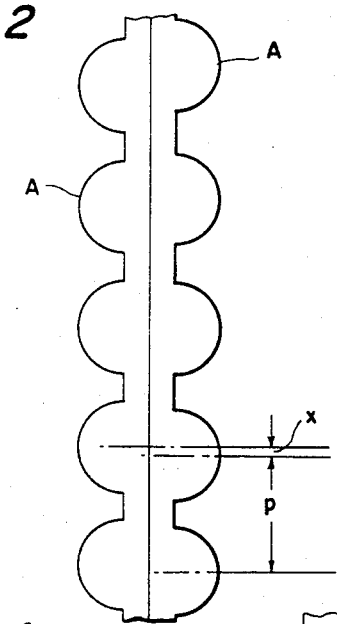
FIGURE 2 is a fragmentary sectional view to a greatly enlarged scale along the line 2—2 of FIGURE 1.

The pattern of FIGURE 1 is produced by laminating two lengths of sheet material which has been produced with embossments upon one side only by cyclic increase and decrease in the amount of stretch in apparatus similar to that illustrated in FIGURES 4 and 5 and having distortion of pattern as diagrammatically illustrated in FIGURE 21. In this pattern embodiment, the two lengths of sheet material are laminated together back-to-back with the curvilinear axes or direction of stretch in the sheet material extending oppositely and with the areas of maximum distortion out of phase. Some areas will have axes more closely paralleling each other to provide a visual pattern to the naked eye having "knotholes" designated by the letter K wherein the embossments maintain substantially the same degree of axial alignment over a multiplicity of embossments to provide an area of high reflectivity. The embossments will phase in and out of axial registry over varying periods along the several axes of the sheet pattern depending upon the distortion occurring in the various areas to provide bands appearing as rings designated by the letter R about the knotholes K which may be somewhat irregular due to aberrations in the uniformity of distortion. Extending into the spacing between the knotholes K are also generally hyperbolic bands H.

The same cyclically distorted sheet material may also be used to provide the pattern embodiment of FIGURE 14 by laminating two lengths back-to-back but with the distorted axes or direction of stretch extending in the same direction and the areas of maximum distortion out-of-phase. The alignment of the areas of maximum distortion is graphically illustrated in FIGURE 22. Here there is produced a visual pattern wherein light and dark ribbons extend normal to the direction of stretch in cyclically increasing and decreasing spacing depending upon the period for the embossments to phase in and out of axial registry.

Figure 12:
FIGURE 12 is an illustration of still another embodiment of visual pattern wherein ribbons similar to those of FIGURE 11 are unevenly spaced apart.

If the sheet material is substantially uniformly stretched in its lengthwise direction in the manner diagrammatically illustrated in FIGURE 10 and then laminated back-to-back with the distorted axes or direction of stretch extending oppositely of each other as diagrammatically illustrated in FIGURE 19, the resulting visual pattern will appear as in FIGURE 12. Here the apparent ribbons resulting from the periods of alignment extend in the direction of stretching and are spaced apart more greatly in the center area of the sheet as the distorted axes more closely parallel each other and the ribbons are spaced more closely in the side areas of the sheet.

Figure 6:
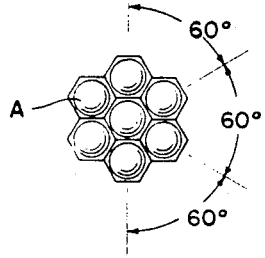
FIGURE 6 is an illustration of a symmetrical hexagonal pattern of embossments of the type shown in FIGURES 2 and 3.
Figure 13:
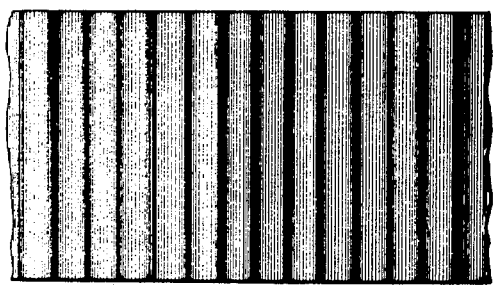
FIGURES 13–18 are illustrations of additional embodiments of patterns produced in accordance with the present invention.

The visual pattern in FIGURE 13 results from combining a length of sheet material stretched uniformly in the lengthwise direction with a length of sheet material of undistorted hexagonal pattern illustrated in FIGURE 6. The apparent ribbons now extend normal to the direction of the stretch in the stretched length and are spaced apart substantially uniformly as the result of substantially equal periods for phasing of the embossments.

Figure 15:
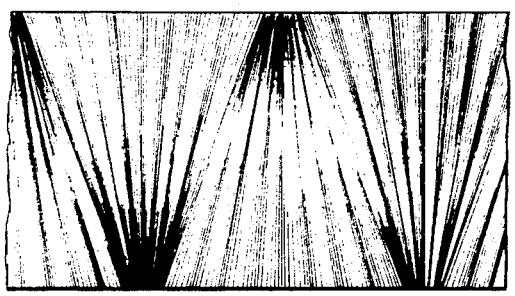

The visual pattern in FIGURE 15 is produced by combining two lengths of sheet material which have been eccentrically stretched more greatly first to one side of the center line of the sheet material and then to the other side to produce asymmetric curvilinear axes as diagrammatically illustrated in FIGURE 20. Two lengths of the sheet material are superposed with the patterns having their curvilinear axes or direction of stretch extending in the same direction but out-of-phase with each other. The resultant visual pattern is one in which generally conically arranged arrays of ribbons extend first from one side and then from the other side in a direction transversely of the direction of stretch.

Figure 18:
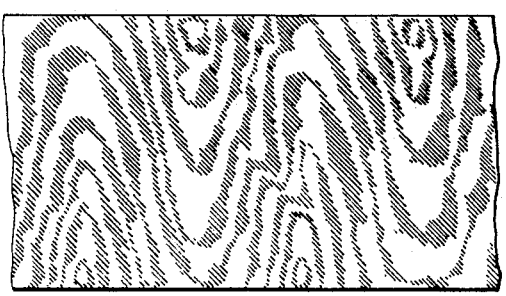

The same eccentrically stretched material may be used to produce the visual pattern of FIGURE 18 by combining the two lengths of sheet material so that the curvilinear axes extend oppositely of each other and are out-of-phase. The pattern is generally similar to that of FIGURE 1 in principle but the rings and bands are now asymmetric with respect to the center line of the sheet material.

Figure 7:
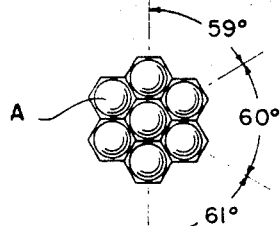
FIGURE 7 is an illustration of an asymmetrical hexagonal pattern of such embossments.
Figure 11:
FIGURE 11 is an illustration of another embodiment of visual pattern produced in accordance with the teachings of the present invention.

The visual pattern of FIGURE 11 relies upon a pattern of embossments which utilizes a plurality of axes which intersect to define two (or more) differing included angels as illustrated in FIGURE 7. By superposing two such patterns with one axis of each extending parallel to the axis of the other, the other axes will diverge to produce periods of relative uniformity transversely of the parallel extending axes. The resultant visual pattern is illustrated in FIGURE 11 as a series of ribbons substantially equal in spacing and size extending in the direction of sheet extrusion.

By controlling the stretching operation so that the material does not neck in, the web may be elongated to increase the spacing between centers of embossments in the direction of stretch altering the rectilinearity of the axes. In producing the necked in material, the material is relatively free from restraint against such contraction and is stretched from a point several times its width away. By stretching the material over a relatively short distance and desirably frictionally constraining the material between a pair of rubber-surfaced stretching-rolls, the material may be elongated without contraction transversely or necking in. By use of cams or other means, this stretching may be cyclic and/or eccentric with respect to the center line of the sheet material.

Figure 16:
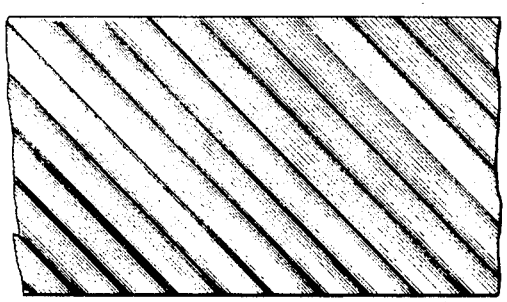

The visual pattern illustrated in FIGURE 16 results from the use of sheet material which is elongated without necking and has an embossing roll with a pattern having its axes intersecting to define two differing included angles. By combining a length of such stretched sheet material either with another length of such stretched material or with a length of the unstretched but asymmetric axis pattern material, the ribbon pattern produced is one which has the ribbons running at an angle to the direction of stretching.

Figure 17:
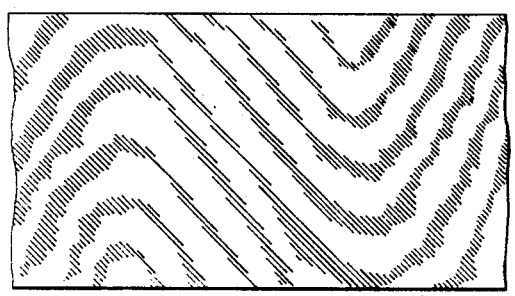

If the sheet material with asymmetric axes is cyclically stretched without necking to greater and lesser amounts, still different patterns may be obtained. In FIGURE 17, there is illustrated a visual pattern which employs sheet material which has been stretched to greater and lesser degree than the degree of stretch of the sheet material with which it is combined, thus resulting in ribbons which criss-cross the width of the sheet material. Conveniently this may be done by using a length of sheet material which is uniformly stretched and a length of sheet material which has been cyclically stretched within a range extending below and above the degree of stretch of the first sheet material.

In each of the patterns previously described, it can be seen that the lens-like and reflective embossments are maintained in substantially the same degree of axial alignment over a multiplicity of embossments along one axis of the pattern and the period for the formations to phase in and out of registry is made greater along one axis in at least some areas of the sheet material than the period along another axis of the pattern. In those patterns using the opposed curvilinear axes, this extended alignment occurs, for example, when the axes approach parallel extension and alignment as in the center area in FIGURE 12 and the knotholes in FIGURES 1 and 18. In the ribbon patterns, the parallel extension occurs along the length of the ribbons and the embossments phase in and out of registry across the width of the ribbons. In the cyclically stretched material, the effect of varying period is even more pronounced.

It can also be seen that the stretching with necking in of the sheet material superimposes upon a single pattern some degree of the several types of distorted pattern which may be utilized in accordance with the present invention.

The following are specific examples illustrative of the present invention:

Example 1

An embossing roll was prepared having a symmetrical hexagonal pattern of cavities therein of generally spheroidal configuration spaced 0.010 inch on centers. Polycarbonate sheet material was extruded in apparatus similar to that illustrated in FIGURES 4 and 5 utilizing the above embossing roll and was cyclically stretched in the range of 3½–4½ percent with necking in of the sides of the sheet material. The resultant sheet material was approximately 0.008 inch in thickness.

Two lengths of the sheet material thus produced were then laminated back-to-back with their direction of stretch extending in opposite directions and their areas of maximum distortion out-of-phase by applying methylene chloride solvent therebetween prior to passing them between a pair of rubber pressure rolls. The resultant sheet material had a total thickness of about 0.016 inch and presented a visual pattern of knotholes and rings (a modified Cassinian figure) similar to that of FIGURE 1.

Example 2

The embossing roll and apparatus of Example 1 were utilized by employing bearings for the stretching roll which were out of round by 0.020 inch at opposite ends of the roll and 180° out of phase, the roll having a diameter of 4½ inches.

In this instance, polycarbonate sheet material of about 0.008 inch thickness thus cyclically eccentrically stretched was laminated to itself back-to-back with the distorted axes extending oppositely of each other and with the areas of maximum distortion out-of-phase. The resultant visual pattern was one in which there were knotholes cyclically alternating from one side to the other of the center line of the sheet material as in FIGURE 18.

Example 3

The embossing roll here employed had cavities similar to those of Example 1 but the pattern had asymmetric axes as illustrated in FIGURE 7. The rubber stretching roll was closely spaced to the embossing roll and the stretching was controlled to eliminate substantially any necking in of the sheet material.

A first length of sheet material was extruded and stretched uniformly (without necking in) about 1½ percent. A second length was extruded and stretched cyclically within the range of ½–2½ percent. Upon lamination back-to-back, with the direction of stretch of both lengths extending in the same direction, the resultant visual pattern was one of a series of ribbons criss-crossing the sheet material along its length and similar to that illustrated in FIGURE 17.

Thus, it can be seen that the present invention provides sheet material capable of a wide range of moire patterns. By combining the various techniques for achieving distorted patterns, great versatility is provided to the designer in predetermining patterns of unusual optical effects for a wide range of decorative and reflective uses. The methods employed are simple and relatively easily controlled, thus enabling the manufacture of such material at relatively low cost.

Having thus described the invention, I claim:

1. Synthetic plastic material for producing a visual moire pattern having a body portion of substantial length and width dimensions providing front and rear surfaces, said material being of substantially uniform thickness and having a multiplicity of closely spaced curvilinear lens-like embossments arranged in a first pattern on the front surface thereof, each lens-like embossment projecting on an axis perpendicular to said front and rear surfaces, said material also having a multiplicity of closely spaced reflective embossments arranged in a second pattern on said rear surface, each reflective embossment projecting on an axis perpendicular to said front and rear surfaces, each of said lens-like and reflective embossments diminishing in cross-section outwardly from said body portion in all planes which include its perpendicular axis to provide side walls tapering inwardly from said body portion toward said perpendicular axis, each of said lens-like embossments being curvilinear in cross section in all planes which include said perpendicular axis and in all planes which extend normally through said perpendicular axis, said reflective embossments phasing in and out of perpendicular axis registry with said lens-like embossments in at least one direction of said surfaces to provide varying optical effects due to variation in the angle of incidence of light rays focused by said lens-like embossments of said front surface onto the tapering side walls of the reflective embossments of said rear surface, the center-to-center close spacing of said lens-like embossments deviating not more than 10 percent from the center-to-center close spacing of said reflective embossments, said close spacing of said lens-like and reflective embossments precluding any bands of flat surface therebetween in any direction of said surfaces, said tapering side walls of said reflective embossments reflecting the predominant portion of light rays impinging thereon, said material being of a thickness to effect substantial focusing of light rays passing through said lens-like embossments and impinging upon said reflective embossments for substantial reflection thereof, said patterns of said embossments on said front and rear surfaces each having a plurality of pattern axes, the period for the lens-like and reflective embossments to phase into and out of perpendicular axis registry being greater along one pattern axis in at least some areas of the material than the period for such phasing of said lens-like and reflective embossments along another pattern axis of the same pattern, said variations in period producing areas in which said lens-like and reflective embossments are in substantially the same degree of perpendicular axis alignment over a multiplicity of consecutive embossments along said one pattern axis in at least some areas of the material, said variations in period and extended areas of perpendicular axis alignment producing bands of brightly reflective areas and of poorly reflective areas which form a visual moire pattern.

2. The material of claim 1 wherein one axis of each of said patterns of said reflective and said lens-like embossments is curvilinear and the curvilinear axes of the two patterns extend oppositely of each other to produce areas in said material wherein said curvilinear axes cross at an included angle of not more than 20 degrees and areas wherein said curvilinear axes extend substantially parallel for a multiplicity of embossments, said patterns thus producing said variations in period and extended areas of alignment.

3. The material of claim 1 wherein said patterns of said reflective and said lens-like embossments each have a plurality of axes intersecting to define two differing included angles, said patterns of said reflective and said lens-like embossments being superposed with one axis of each pattern extending substantially parallel to one axis of the other pattern and another axis of one pattern diverging from another axis of the other, said embossments of said patterns being substantially uniform in the degree of axial alignment along said parallel extending axes and phasing in and out of perpendicular axis registry along said another axes to produce a visual pattern of ribbons of relative brightness and relative darkness.

4. The material of claim 1 wherein the spacing between centers of the formations of at least one of said patterns of said reflective and said lens-like embossments varies cyclically along at least said one direction of said surfaces to provide said variations in period and extended areas of alignment.

5. The material of claim 1 wherein a plurality of axes of one of said patterns of said reflective and said lens-like embossments intersect to define two differing included angles and the axes of the other of said patterns intersect to define substantially equal included angles, one axis of one of said patterns extending parallel to one axis of the other of said patterns.

6. The material of claim 1 wherein one of said patterns of said reflective and said lens-like embossments has a curvilinear axis along which said embossments are arranged with the included angle defined by the intersection therewith of another axis of said one pattern varying along said curvilinear axis, the other of said patterns having its axes intersecting to define substantially equal included angles, one axis of one of said patterns extending substantially parallel to one axis of the other of said patterns, said patterns having their embossments in substantially uniform perpendicular axis alignment along said parallel extending axes and phasing in and out of perpendicular axis registry along said curvilinear axis to produce a visual pattern of ribbons of relative brightness and darkness.

7. The material of claim 1 wherein one axis of one of said patterns of said reflective and said lens-like embossments extends in substantially curvilinear configuration of cyclically increasing and decreasing depth of curvature.

8. The material of claim 1 wherein each of said patterns of said reflective and said lens-like embossments has one axis which extends in substantially curvilinear configuration and of cyclically increasing and decreasing depth of curvature.

9. The material of claim 8 wherein said patterns bow in the same direction of said surfaces and with the curvilinear axis of one of said patterns out of phase with the curvilinear axis of the other of said patterns to produce a visual pattern of ribbons of relative brightness and darkness and of varying spacing.

10. The material of claim 1 wherein one axis of one of said patterns of said reflective and said lens-like embossments alternately is elongated along another axis thereof first to one side of the center line of the material and then on the other side of the center line of the material.

11. The material of claim 1 wherein one axis of each of said patterns of said reflective and said lens-like embossments is alternately elongated along another axis thereof first on one side of the center line of the material and then on the other side of the center line of the material, said patterns being superposed with the elongated areas out of phase to produce a visual pattern of ribbons of greater spacing first on one side of the center line of the material and then on the other side of the center line.

12. The material of claim 1 wherein one axis of each of said patterns of said reflective and said lens-like embossments is curvilinear and varies in depth of curvature along one horizontal axis of the sheet material and said patterns are superposed with said curvilinear axes extending oppositely of each other, said curvilinear axes of said patterns crossing at an angle of not more than 20 degrees and having center areas wherein they extend substantially parallel to produce a visual pattern of concentric arcs.

13. The material of claim 1 wherein one axis of each of said patterns of said reflective and said lens-like embossments is curvilinear and each of said patterns is alternately elongated more greatly along an axis intersecting with its curvilinear axis in areas first one one side of the center line of said material and then in areas on the other side of the center line of said material with alternately varying depth of curvature of said curvilinear axes along said intersecting axis, said patterns being superposed with the alternately elongated areas out of phase, said curvilinear axes crossing at an angle of not more than 20 degrees and said curvilinear axes extending substantially parallel in some areas first to one side of the center line of the material and then to the other side to produce a visual pattern of substantially ecentric arcs.

14. The material of claim 1 wherein each of said patterns of said lens-like and reflective embossments has a plurality of axes intersecting to define two differing included angles and one of said patterns has a greater spacing between centers of the embossments thereof along one axis than the spacing between centers of the embossments of the other of said patterns along the corresponding axis thereof, said patterns being superposed with another axis of each extending substantially parallel.

15. The sheet material of claim 1 wherein each of said patterns of said lens-like and reflective embossments has a plurality of axes intersecting to define two differing included angles and one of said patterns has the spacing between centers of the embossments thereof along one axis cyclically varying between greater and lesser than the spacing between centers of the embossments of the other of said patterns along the corresponding axis thereof, said patterns being superposed with another axis of each extending substantially parallel.

16. The material of claim 1 wherein said reflective embossments have a reflective coating thereon.

17. The material of claim 1 wherein said embossments are arranged in a closely spaced hexagonal pattern providing three intersecting axes.

18. Synthetic plastic material for producing a visual moire pattern having a body portion of substantial length and width dimensions providing front and rear surfaces, said material being of substantially uniform thickness and having a multiplicity of closely spaced curvilinear lens-like embossments arranged in a first pattern on the front surface thereof, each lens-like embossment projecting on an axis perpendicular to said front and rear surfaces, said material also having a multiplicity of closely spaced reflective embossments arranged in a second pattern on said rear surface of lens-like configuration similar to the embossments on said front surface and each reflective embossment projecting on an axis perpendicular to said front and rear surfaces, each of said lens-like and reflective embossments diminishing in cross-section outwardly from said body portion in all planes which include its perpendicular axis to provide side walls tapering inwardly from said body portion toward said perpendicular axis each of said lens-like and reflective embossments being curvilinear in cross section in all planes which include said perpendicular axis and in all planes which extend normally through said perpendicular axis, said reflective embossments phasing in and out of perpendicular axis registry with said lens-like embossments in at least one direction of said surfaces to provide varying optical effects due to variation in the angle of incidence of light rays focused by said lens-like embossments of said front surface onto the tapering side walls of the reflective embossments of said rear surface, the close center-to-center spacing of said lens-like embossments deviating not more than 10 percent from the close center-to-center spacing of said reflective embossments, said close spacing of said lens-like and reflective embossments precluding any bands of flat surface therebetween in any direction of said surfaces, said tapering side walls of said reflective embossments tapering at an angle greater than the critical angle for said synthetic plastic to reflect the predominant portion of light rays impinging thereon, the perpendicular axis distance between the outer surface of said lens-like embossments and the opposite outer surface of said reflective embossments being substantially equal to the focal length of said lens-like embossments of said front surface to effect substantial focusing of light rays passing through said lens-like embossments onto the walls of said reflective embossments for substantial reflection thereof, said patterns of said embossments on said front and rear surfaces each having a plurality of pattern axes, the period for the lens-like and reflective embossments to phase into and out of perpendicular axis registry being greater along one pattern axis in at least some areas of the material than the period for such phasing of said lens-like and reflective embossments along another pattern axis of the same pattern, said variations in period producing areas wherein said lens-like and reflective embossments are in substantially the same degree of perpendicular axis alignment over a multiplicity of consecutive embossments along said one pattern axis in some areas of the material, said variations in period and extended areas of alignment producing bands of brightly reflective areas and of poorly reflective areas which form a visual moire pattern.

19. The synthetic plastic material of claim 8 wherein said reflective embossments have a reflective coating thereon.

References Cited
UNITED STATES PATENTS 2,951,419  9/1960  Lemelson _____ 88—82

OTHER REFERENCES

Unlighted Signs That Shine, Rohm & Haas Reporter, March-April 1952 (copy supplied by applicant).

JEWELL H. PEDERSEN, *Primary Examiner.*

A. A. KASHINSKI, *Assistant Examiner.*